(12) United States Patent
Harris et al.

(10) Patent No.: US 9,642,502 B2
(45) Date of Patent: May 9, 2017

(54) DUAL AIR CHAMBER FOAM PUMPS, REFILL UNITS AND DISPENSERS

(71) Applicant: GOJO Industries, Inc., Akron, OH (US)

(72) Inventors: Donald R. Harris, Tallmadge, OH (US); John J. McNulty, Broadview Heights, OH (US); Aaron D. Marshall, Uniontown, OH (US)

(73) Assignee: GOJO Industries, Inc., Akron, OH (US)

(*) Notice: Subject to any disclaimer, the term of this patent is extended or adjusted under 35 U.S.C. 154(b) by 31 days.

(21) Appl. No.: 14/721,141

(22) Filed: May 26, 2015

(65) Prior Publication Data
US 2015/0342421 A1    Dec. 3, 2015

Related U.S. Application Data

(60) Provisional application No. 62/003,951, filed on May 28, 2014.

(51) Int. Cl.
*B67D 7/06* (2010.01)
*A47K 5/14* (2006.01)
(Continued)

(52) U.S. Cl.
CPC .............. *A47K 5/14* (2013.01); *A47K 5/1211* (2013.01); *B05B 7/0037* (2013.01);
(Continued)

(58) Field of Classification Search
CPC ......... B67D 7/06; G01F 11/02; G01F 11/025; G01F 11/14; A47K 5/14; A47K 5/1211;
(Continued)

(56) References Cited

U.S. PATENT DOCUMENTS 5,129,550 A * 7/1992 Eschbach ................ B05B 11/02
222/135
5,462,208 A * 10/1995 Stahley ................ B05B 7/0037
222/190

(Continued)

FOREIGN PATENT DOCUMENTS

WO        2013022634 A1    2/2013

*Primary Examiner* — Paul R Durand
*Assistant Examiner* — Andrew P Bainbridge
(74) *Attorney, Agent, or Firm* — Calfee, Halter & Griswold LLP

(57) ABSTRACT

Exemplary two chamber foam pumps, refill units and dispensers utilizing the same are disclosed herein. An exemplary refill unit includes an inverted container having a neck located at the bottom of the container and a foam pump secured neck. The foam pump includes a first air pump chamber, a liquid pump chamber and a second air pump chamber. In addition, the pump includes a piston. The piston has a hollow central portion. A first air inlet aperture is located through a wall of the piston between the first air pump chamber and the hollow central portion. A liquid inlet aperture is located below the first air inlet aperture and between the liquid pump chamber and the hollow central portion. A second air inlet aperture is located through the wall the piston located below the liquid inlet aperture and between the second air pump chamber and the hollow central portion.

20 Claims, 2 Drawing Sheets

(51) Int. Cl.
*B05B 11/00* (2006.01)
*A47K 5/12* (2006.01)
*B05B 7/00* (2006.01)
B05B 7/24 (2006.01)
G01F 11/14 (2006.01)
G01F 11/02 (2006.01)
F04B 1/12 (2006.01)
F04B 9/131 (2006.01)
F04B 9/14 (2006.01)

(52) U.S. Cl.
CPC ...... *B05B 11/3001* (2013.01); *B05B 11/3087* (2013.01); *B05B 11/3097* (2013.01); *B05B 7/2427* (2013.01); *B05B 7/2437* (2013.01); *B05B 7/2464* (2013.01); *B05B 11/3052* (2013.01); *F04B 1/124* (2013.01); *F04B 9/1315* (2013.01); *F04B 9/14* (2013.01); *G01F 11/025* (2013.01); *G01F 11/14* (2013.01)

(58) Field of Classification Search
CPC .......... B65D 5/72; B65D 37/00; B65D 35/38; F04B 1/12; F04B 9/14; F04B 9/1315; F04B 1/124; B05B 7/2435; B05B 11/0054; B05B 11/3087; B05B 7/2427; B05B 7/2437; B05B 7/2464; B05B 7/0037; B05B 11/3001; B05B 11/3097

USPC .... 222/129, 190, 541.1–541.9, 383.1, 383.3, 222/189.09–189.11, 321.7–321.9, 145.1, 222/145.5–145.6
See application file for complete search history.

(56) References Cited

U.S. PATENT DOCUMENTS

| | | | | |
|---|---|---|---|---|
| 5,544,788 | A * | 8/1996 | Meyer | B67D 99/00 222/110 |
| 6,082,586 | A * | 7/2000 | Banks | A47K 5/14 222/105 |
| 7,708,166 | B2 * | 5/2010 | Ophardt | B05B 7/0037 222/181.1 |
| 8,827,119 | B2 * | 9/2014 | Ciavarella | B65D 83/00 222/181.1 |
| 8,875,952 | B2 * | 11/2014 | Ciavarella | B05B 7/0025 222/145.5 |
| 2012/0308405 | A1 | 12/2012 | McNulty | |
| 2014/0319180 | A1 * | 10/2014 | Quinlan | A47K 5/16 222/190 |
| 2015/0209811 | A1 * | 7/2015 | Ophardt | B05B 11/3087 222/190 |
| 2015/0342421 | A1 * | 12/2015 | Harris | A47K 5/14 222/190 |

* cited by examiner

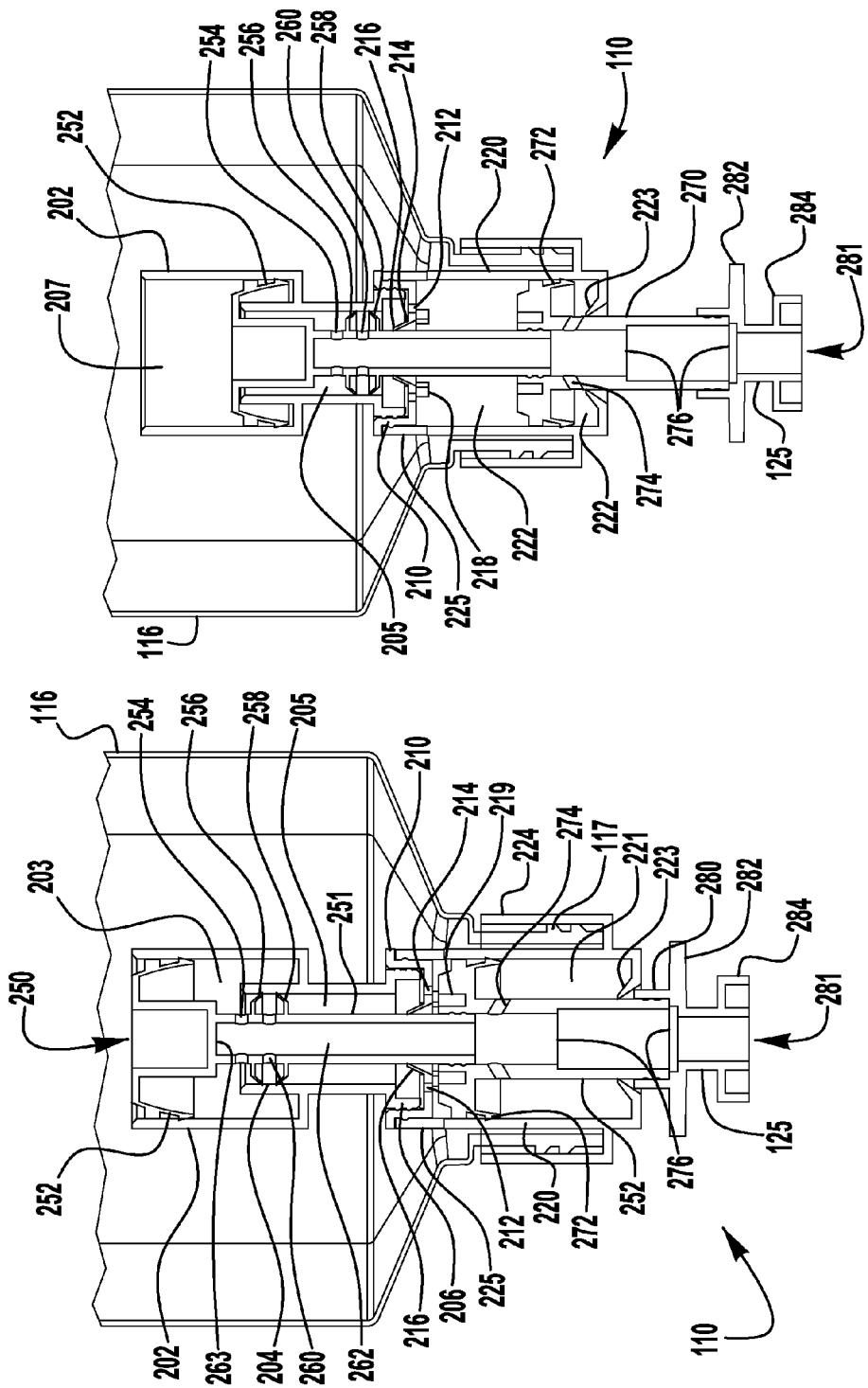

ated May 28, 2014 and entitled "DUAL AIR CHAMBER FOAM
DUAL AIR CHAMBER FOAM PUMPS, REFILL UNITS AND DISPENSERS

RELATED APPLICATIONS

This application claims priority to and the benefits of U.S. Provisional Patent Application Ser. No. 62/003,951 filed on May 28, 2014 and entitled "DUAL AIR CHAMBER FOAM PUMPS, REFILL UNITS AND DISPENSERS," which is incorporated herein by reference in its entirety.

TECHNICAL FIELD

The present invention relates generally to foam pumps, refill units and dispenser systems and more particularly dual air chamber foam pumps, refill units and dispensers utilizing dual air chamber foam pumps.

BACKGROUND OF THE INVENTION

Liquid dispenser systems, such as liquid soap and sanitizer dispensers, provide a user with an amount of foam upon actuation of the dispenser. In order to create a foam output having a desirable characteristic, the air to liquid ratio is generally about 10 to 1. To accomplish this, most prior art foam pumps have an air pump chamber that has an outside diameter that is larger than the interior diameter of the neck of the container. Consequently, the air pump chamber is typically located outside of the neck of the container. Locating the air pump chamber outside of the container increases the overall size of the refill and increases the shipping costs.

SUMMARY

Exemplary two chamber foam pumps, refill units and dispensers utilizing the same are disclosed herein. An exemplary refill unit includes an inverted container having a neck located at the bottom of the container and a foam pump secured neck. The foam pump includes a first air pump chamber, a liquid pump chamber and a second air pump chamber. In addition, the pump includes a piston. The piston has a hollow central portion. A first air inlet aperture is located through a wall of the piston between the first air pump chamber and the hollow central portion. A liquid inlet aperture is located below the first air inlet aperture and between the liquid pump chamber and the hollow central portion. A second air inlet aperture is located through the wall the piston located below the liquid inlet aperture and between the second air pump chamber and the hollow central portion. The refill unit also includes an outlet.

Another exemplary refill unit includes an inverted container having a neck located at the bottom of the container, foamable liquid contained in the inverted container and a pump secured neck. The pump has a first cylindrical chamber, a second cylindrical chamber; and a third cylindrical chamber. The pump includes a first air pump wiper seal is movable in a reciprocating fashion within the first cylindrical chamber. In addition, a second air pump wiper seal is included that is movable in a reciprocating fashion within the third cylindrical chamber. A pair of opposing liquid pump wiper seals is movable in a reciprocating fashion within the second cylindrical chamber. A foam outlet nozzle is also included. A passage is located between the first cylindrical chamber, the second cylindrical chamber, the third cylindrical chamber and the foam outlet nozzle. An opening in the first cylindrical chamber allows liquid to contact a top portion of the first air pump wiper seal and an opening in the third cylindrical chamber allows liquid to contact a top portion of second air pump wiper seal.

Another exemplary refill unit includes an inverted container having a neck located at the bottom of the container. A foamable liquid is contained in the inverted container and a foam pump is secured neck. The foam pump includes a first cylindrical member forming a portion of an air pump chamber, a second cylindrical member forming a portion of a liquid pump chamber and a third cylindrical member forming a portion of a second air pump chamber. The foam pump includes a piston having a second air pump sealing member movable within the second air pump chamber to pump air and also includes an opening between the interior of the container and the interior of the upper portion of third cylindrical chamber. The opening allows liquid to flow into the upper portion of the third cylindrical chamber and contact the upper portion of the second air pump sealing member.

In this way, a simple and economical dual air chamber foam pumps, refill units and dispensers for same are provided.

BRIEF DESCRIPTION OF THE DRAWINGS

These and other features and advantages of the present invention will become better understood with regard to the following description and accompanying drawings in which:

FIGS. 2 and 3 are partial cross-sections of an exemplary refill unit having dual air chamber foam pump.

DETAILED DESCRIPTION

Figure 1:
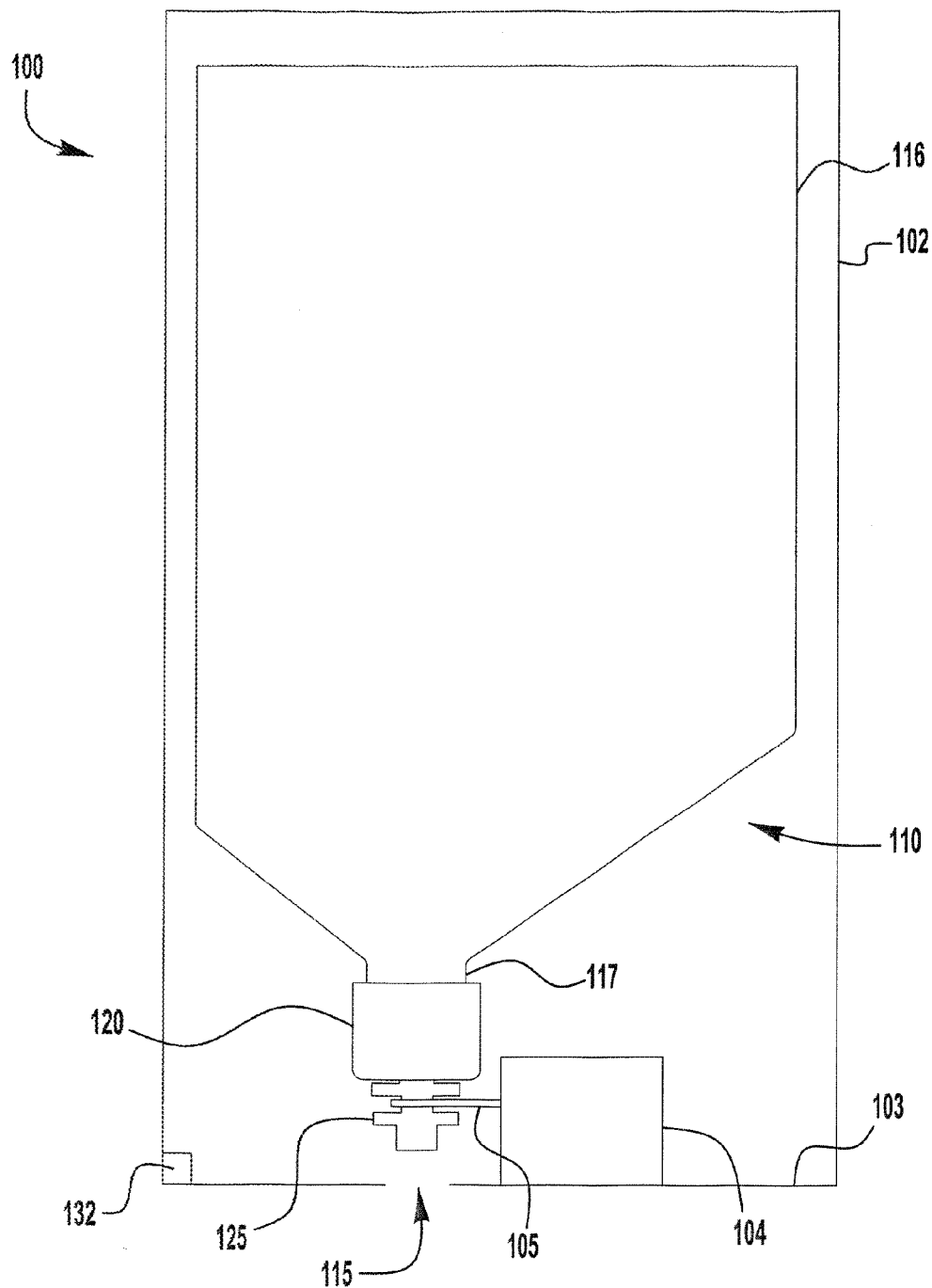
FIG. 1 is a cross-section of an exemplary liquid dispenser having a refill unit with a vertical pump.

FIG. 1 illustrates an exemplary embodiment of a dispenser 100 with a vertically operated pump 120. (The cross-section of FIG. 1 is taken through the housing 102 to show the foam pump 120 and container 116). Foam pump 120 is a dual air chamber foam pull pump. Dispenser 100 includes a disposable refill unit 110. The disposable refill unit 110 includes a container 116 having a neck 117 connected to pump 120. The dispenser 100 may be a wall-mounted system, a counter-mounted system, an un-mounted portable system movable from place to place or any other kind of liquid dispenser system.

The container 116 forms a liquid reservoir that contains a supply of foamable liquid within the disposable refill unit 110. In various embodiments, the contained liquid could be, for example, a soap, a sanitizer, a cleanser, a disinfectant, a lotion or the like. In the exemplary disposable refill unit 110, the container 116 is a collapsing container and can be made of thin plastic or like material. The container 116 may advantageously be refillable, replaceable or both refillable and replaceable. In some embodiments, the container 116 is non-collapsing and a vent (not shown) is provided to vent the container 116 with air to prevent a vacuum in the container 116 that would prevent the foam pump 120 from priming.

In the event the liquid stored in the container 116 of the installed disposable refill unit 110 runs out or the installed refill unit 110 otherwise has a failure, the installed refill unit 110 may be removed from the foam dispenser 100. The empty or failed disposable refill unit 110 may then be replaced with a new disposable refill unit 110.

The housing 102 of the dispenser 100 contains one or more actuating members 104 to activate the pump 120. As used herein, actuator or actuating members or mechanisms include one or more parts that cause the dispenser 100 to move liquid, air and/or foam. Actuator 104 is generically illustrated because there are many different kinds of pump actuators which may be employed in the foam dispenser 100. The actuator 104 of the foam dispenser 100 may be any type of actuator such as, for example, a manual lever, a manual pull bar, a manual push bar, a manual rotatable crank, an electrically activated actuator or other means for actuating the pump 120. Electronic actuators may additionally include a sensor 132 for detecting the presence of an object and to provide for a hands-free dispenser system with touchless operation. Various intermediate linkages, such as for example linkage 105, connects the actuator member 104 to the pump 120 within the dispenser housing 102. An aperture 115 is located in bottom plate 103 of housing 102 and allows fluid dispensed from the nozzle 125 of pump 120 to be dispensed to a user. In one exemplary embodiment, during operation, actuator 104 and linkage 105 move nozzle 125 of pump 120 to its upward-most position (as shown in FIG. 1) to prime or charge the foam pump 120. The actuator 104 and linkage 105 pulls nozzle 125 downward to dispense a foam product.

FIGS. 2 and 3 are partial cross-sections of an exemplary embodiment of refill unit 110. FIG. 2 illustrates pump 110 in its primed state and FIG. 3 illustrates pump 110 in its dispensed state. Pump 110 includes a first cylindrical housing 202 and second smaller cylindrical housing 204. First cylindrical housing 202 forms a part of a first air pump chamber 203. Second cylindrical housing 204 extends partway up into first cylindrical housing 202. The top of first cylindrical housing 202 is open to the container 116. Seal plate 210 snaps on to a lower flared out portion 206 of second cylindrical housing member 204.

Seal plate 210 includes one or more openings 212 therethrough for liquid to flow up into liquid chamber 205 which is formed in part by second cylindrical housing 204. The outer portion of an annular seal 214 is compressed between the bottom of second cylindrical housing 202 and seal plate 210 to secure the annular seal 214 in place. The annular seal 214 acts of one-way liquid inlet valve that allows fluid to flow through one or more openings 212 up into liquid chamber 205. Seal plate 210 also includes wiper seal 216 which forms a seal against a stem portion 251 of piston 250.

Secured to seal plate 210 is a third cylindrical housing 220. Third cylindrical housing 220 has a base that includes a wiper seal 223 that seals against stem portion 252 of piston 250. Third cylindrical housing 220 also includes one or more slits 225 that provide a pathway for liquid in container 116 to flow into the upper portion of the third cylindrical housing member 206. In some embodiments, slits 225 may be replaced by one or more apertures. Third cylindrical housing 220 also includes a closure member 224. Closure member 224 secures pump 110 to the neck 117 of container 116. A gasket (not shown) may be included in closure member 224 to seal between closure 224 and the top of neck 117 to provide additional leakage protection. Third cylindrical housing 220 forms a portion of second air pump chamber 221. Third cylindrical housing 220 also forms a portion of a liquid pumping chamber 222.

Piston 250 has a first air pump wiper seal 252 that reciprocates within first cylindrical housing 202. In addition, piston 250 has a hollow central portion 262 that is sealed off at the top by plate 263. Located below plate 263 are one or more first air inlet openings 254 that provide a passageway from first air pump chamber 203 into the hollow central portion 262 of piston 250.

Piston 250 also includes a pair of opposed liquid wiper seals 256 and 258 that reciprocate up and down in second cylindrical housing member 204. One or more liquid inlet openings 260 are located between the pair of opposed liquid wiper seals 256, 258 and below the first air inlet openings 254. The one or more liquid inlet openings 260 allow foamable liquid to pass from liquid chamber 205 into the hollow central portion 262 of piston 250.

In addition, piston 250 includes a second air pump wiper seal 272 that reciprocates up and down in third cylindrical housing 206. Piston 250 has one or more second air inlet openings 274 that allow air to move between second air chamber 221 and the central portion 262 of piston 250. Second air inlet openings 274 are angled upward. Second air inlet openings 274 are located below liquid inlet openings 260. In some embodiments, the second air inlet openings are located proximate the second air pump wiper seal 272.

Piston 252 includes mix media 276. Mix media 276 may be for example, a pair of screens 276. In some embodiments, mix media 276 may be a plurality of baffles, one or more porous members, or the like that impart turbulence in the flow path in hollow central portion 262 and create a thorough mixing of the air and foamable liquid to create a rich foam is dispensed out of outlet 281 of nozzle 125. Nozzle 125 includes a first cylindrical projecting member 282 and a second cylindrical projecting member 284 that releasably engage with an actuator (not shown) to move piston 250 up and down.

In some embodiments a shipping seal 218 is also included. Shipping seal 218 is part of seal plate 210, however shipping seal 218 may be a separate part affixed to seal plate 210. Shipping seal 218 engages an annular groove 219 on wiper seal 272. When the refill unit 110 is shipped, shipping seal 218 fits within annular groove 219 and provides a sealing mechanism to seal a potential leakage passage that might allow the refill unit 110 to leak during shipping.

Pump 110 is shown as primed position in FIG. 2. As pump 110 is moved to the position shown in FIG. 3, first pump chamber 203 is compressed and air from first pump chamber 203 flows through one or more openings 254 into the central portion 262 of stem 251. Simultaneously liquid from liquid chamber 205 flows past wiper seal 258 through one or more openings 260 into the hollow central portion 262 of stem 251 where it mixes with the air and is forced downward through hollow central portion 262.

In addition second air pump chamber 221 is compressed forcing air up through one or more openings 274 in the central portion 262 of stem portion 252. Thus, air from second air pump chamber 221 also mixes with the air and liquid mixture flowing through hollow central portion 262 which adds air to the mixture and helps force the air and liquid mixture to flow through mix media 276 were is converted to rich foam. The rich foam is dispensed out of outlet 281.

In addition, liquid flows from container 116 through one or more slots 225 into liquid pumping chamber 222. Fluid also flows from container 116 into the upper portion 207 of first cylindrical housing member 202 (if the liquid is above the top of first cylindrical housing 202).

As piston 250 moves from the dispensed position shown in FIG. 3 to the primed position shown in FIG. 2, air and residual foam flow up the hollow central portion 262 of stem portions 252. The residual foam is sucked into the second air chamber 221 which prevents dripping. Liquid is pushed out of liquid pumping chamber 222. A portion the liquid flows through one or more openings 212, past annular seal 214 and into liquid chamber 205. The remainder the liquid in liquid pumping chamber 222 is forced back through one or more slits 225 into container 116. The liquid in the upper portion 207 of first cylindrical housing 202 is also pushed up and into the container 116.

In some embodiments forcing liquid out of liquid pump chamber 222 helps to mix the contents of container 116. This may be beneficial if the liquid contains ingredients that may separate out of the foamable liquid and settle to the bottom of the container, such as, for example, zinc. In some embodiments, a screen (not shown) covers slits 225 and material, such as for example, glitter, sparkles, colored balls, or the like, located within container 116 are forced upward by the returning liquid in the container which provides a positive visual display. Such visual displays may encourage children to use the soap or sanitizing dispenser. As piston 250 is moved upward, liquid fills liquid chamber 205 and air fills first air chamber 203 and second air chamber 201. At this point pump 110 is primed and ready to dispense another dose of foam.

While the present invention has been illustrated by the description of embodiments thereof and while the embodiments have been described in considerable detail, it is not the intention of the applicant to restrict or in any way limit the scope of the appended claims to such detail. Additional advantages and modifications will readily appear to those skilled in the art. Therefore, the invention, in its broader aspects, is not limited to the specific details, the representative apparatus and illustrative examples shown and described. Accordingly, departures may be made from such details without departing from the spirit or scope of the applicant's general inventive concept.

We claim:
1. A refill unit comprising:
an inverted container having a neck located at the bottom of the container;
a foam pump secured neck;
the foam pump having:
  a first air pump chamber;
  a liquid pump chamber;
  a second air pump chamber; and
  a piston;
  the piston having:
    a hollow central portion;
    a first air inlet aperture through a wall of the piston between the first air pump chamber and the hollow central portion;
    a liquid inlet aperture located below the first air inlet aperture and between the liquid pump chamber and the hollow central portion;
    a second air inlet aperture through the wall the piston located below the liquid inlet aperture and between the second air pump chamber and the hollow central portion; and
    an outlet.
2. The refill unit of claim 1 further comprising a seal plate located above the liquid pump chamber wherein the seal plate includes one or more apertures.
3. The refill unit of claim 2 further comprising a one-way sealing member that allows liquid to flow into liquid pump chamber and prevents liquid from flowing out of the liquid pump chamber.
4. The refill unit of claim 1 wherein the piston further comprises a first wiper seal that moves in a reciprocating fashion in the first air pump chamber.
5. The refill unit of claim 4 wherein the upper surface of the first wiper seal is in fluid communication with the interior of the container.
6. The refill unit of claim 1 wherein the second air inlet aperture is angled in an upward direction.
7. The refill unit of claim 1 wherein a least a portion of the liquid pump chamber is located within the first air pump chamber.
8. The refill unit of claim 1 wherein the piston is pulled downward to dispense foam.
9. A refill unit comprising:
an inverted container having a neck located at the bottom of the container;
foamable liquid contained in the inverted container;
a pump secured neck;
the pump having:
  a first cylindrical chamber;
  a second cylindrical chamber;
  a third cylindrical chamber;
  a first air pump wiper seal movable in a reciprocating fashion within the first cylindrical chamber;
  a second air pump wiper seal movable in a reciprocating fashion within the third cylindrical chamber;
  a pair of opposing liquid pump wiper seals movable in a reciprocating fashion within the second cylindrical chamber;
  a foam outlet nozzle;
  a passage between the first cylindrical chamber, the second cylindrical chamber, the third cylindrical chamber and the foam outlet nozzle;
  an opening in the first cylindrical chamber that allows liquid to contact a top portion of the first air pump wiper seal; and
  an opening in the third cylindrical chamber that allows liquid to contact a top portion of second air pump wiper seal.
10. The refill unit of claim 9 wherein the first air pump wiper seal the second air pump wiper seal the liquid pump wiper seals are connected to a single piston.
11. The refill unit of claim 10 wherein the piston has a hollow center portion.
12. The refill unit of claim 10 wherein the piston moves downward to dispense foam.
13. The refill unit of claim 11 wherein the piston has a first air inlet aperture located in the top portion of the piston, a liquid inlet aperture located below the first air inlet aperture, and a second air inlet aperture located below the liquid inlet aperture.
14. The refill unit of claim 13 wherein the second air inlet aperture is angled upwards.
15. The refill unit of claim 9 further comprising a seal plate located between the second and third cylindrical chambers, the seal plate one or more apertures along fluid to flow from the third cylindrical chamber up into the second cylindrical chamber.
16. A refill unit comprising:
an inverted container having a neck located at the bottom of the container;
foamable liquid contained in the inverted container;
a foam pump secured neck;
the foam pump having:
  a first cylindrical member forming a portion of an air pump chamber;
  a second cylindrical member forming a portion of a liquid pump chamber; and
  a third cylindrical member forming a portion of a second air pump chamber;

a piston having a second air pump sealing member movable within the second air pump chamber to pump air; and an opening between the interior of the container and the interior of the upper portion of third cylindrical chamber that allows liquid to flow into the upper portion of the third cylindrical chamber and contact the upper portion of the sealing member.

17. The refill unit of claim 16 further comprising a first air pump sealing member movable within the first cylindrical member.

18. The refill unit of claim 17 wherein the first air pump sealing member and the second air pump sealing member are connected to a common piston.

19. The refill unit of claim 18 further comprising a pair of opposed liquid sealing members movable within the second cylindrical member in connected to the common piston.

20. The refill unit of claim 16 further comprising a hollow piston having a first air inlet aperture located proximate the top of the hollow piston, a liquid inlet aperture located below the first air inlet aperture, and a second air inlet aperture located below the liquid inlet aperture.

\* \* \* \* \*